United States Patent
Wataru

(10) Patent No.: US 11,201,498 B2
(45) Date of Patent: Dec. 14, 2021

(54) POWER SUPPLY SYSTEM

(71) Applicant: YAZAKI CORPORATION, Tokyo (JP)

(72) Inventor: Kazuhisa Wataru, Makinohara (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 16/828,892

(22) Filed: Mar. 24, 2020

(65) Prior Publication Data
US 2020/0343763 A1   Oct. 29, 2020

(30) Foreign Application Priority Data
Apr. 25, 2019 (JP) .............................. JP2019-083806

(51) Int. Cl.
*H02J 9/00* (2006.01)
*H02J 9/06* (2006.01)
*H02J 1/10* (2006.01)

(52) U.S. Cl.
CPC .............. *H02J 9/068* (2020.01); *H02J 1/108* (2013.01); *H02J 9/061* (2013.01)

(58) Field of Classification Search
CPC .. H02J 9/068; H02J 7/36; H02J 7/1423; H02J 7/0063; B60L 58/20; B60L 3/0046; B60L 3/0092; B60L 1/00; B60L 3/04; B60R 16/033; B60R 16/03
See application file for complete search history.

(56) References Cited

U.S. PATENT DOCUMENTS

| | | | | |
|---|---|---|---|---|
| 6,304,054 B1* | 10/2001 | Granberg | .............. | H02J 7/1423 320/104 |
| 2009/0230923 A1* | 9/2009 | Hoffman | .............. | H01M 6/5044 320/136 |
| 2016/0368437 A1* | 12/2016 | Boucharel | .............. | H02J 7/166 |
| 2018/0004237 A1* | 1/2018 | Morimoto | .............. | G05D 23/20 |
| 2019/0123545 A1* | 4/2019 | Maekawa | ................ | G05F 1/10 |
| 2019/0237988 A1* | 8/2019 | Maekawa | .............. | G01R 31/50 |

FOREIGN PATENT DOCUMENTS

| | | |
|---|---|---|
| JP | 2016-187235 A | 10/2016 |
| JP | 2016-187236 A | 10/2016 |

* cited by examiner

*Primary Examiner* — Hal Kaplan
*Assistant Examiner* — Rasem Mourad
(74) *Attorney, Agent, or Firm* — Kenealy Vaidya LLP

(57) ABSTRACT

A power supply system includes; a first switch connected between a main power source and loads; a second switch connected between a sub-battery and the loads; and backflow prevention circuit that prevent current backflow between the main power source and the sub-battery, and polarity of the backflow prevention circuit is devised so as to allow current passage in a direction from the sub-power source to the loads even when the second switch is in an off state. When power from the main power source is interrupted, the power source power of the sub-power source is supplied to the loads via the backflow prevention circuit even the second switch remains in the off state, so that the power supply is not interrupted.

5 Claims, 4 Drawing Sheets

FIG. 2

| STATE | SWITCH 14 | BODY DIODE 14a | SWITCH 15 | BODY DIODE 15a | POWER SOURCE POWER SUPPLY TO IMPORTANT LOAD |
|---|---|---|---|---|---|
| STATE A (NORMAL) | ON (CONNECTED) | CURRENT FLOWS THROUGH A PATH OF THE SWITCH | OFF (DISCONNECTED) | CURRENT PASSAGE IS PREVENTED DUE TO REVERSE BIAS | POWER IS SUPPLIED FROM THE MAIN POWER SOURCE |
| STATE B (IMMEDIATELY AFTER POWER INTERRUPTION OF THE MAIN POWER SOURCE) | ON (CONNECTED) | - - - | OFF (DISCONNECTED) | CURRENT IN A FORWARD DIRECTION PASSES (GENERATE HEAT) | POWER IS SUPPLIED FROM THE SUB-BATTERY |
| STATE C (AFTER SWITCHING TO SUB-PATH) | OFF (DISCONNECTED) | CURRENT PASSAGE IS PREVENTED DUE TO REVERSE BIAS | ON (CONNECTED) | CURRENT FLOWS THROUGH A PATH OF THE SWITCH | POWER IS SUPPLIED FROM THE SUB-BATTERY |

POWER SUPPLY SYSTEM

CROSS REFERENCE TO RELATED APPLICATIONS

This application is based on and claims priority from Japanese patent application No. 2019-083806 filed on Apr. 25, 2019, the entire contents of which are incorporated herein by reference.

BACKGROUND OF THE INVENTION

1. Technical Field

The present invention relates to a power supply system that is available, for example, to provide power to an important load in an in-vehicle system.

2. Background Art

A vehicle such as an automobile has various functions for realizing stable traveling. Further, for example, more advanced functions such as driving operation assistance of a driver or automation of driving may be installed, and more and more advanced functions tend to be added in the future.

The in-vehicle system for realizing such advanced functions includes, for example, important electrical components that needs to be constantly operated, such as an in-vehicle camera for capturing an image of a vehicle exterior, and an in-vehicle radar for monitoring an obstacle outside the vehicle. Further, such in-vehicle electrical components, that is, loads, usually operate by using power source power supplied from the vehicle.

Therefore, in a power supply system installed in the vehicle, it is required that supply of the power source power is not interrupted particularly for an important load. Accordingly, for example, in a vehicle provided with the advanced functions, not only a main battery but also a sub-battery may be provided as an in-vehicle power source. That is, when the power source power cannot be supplied to an important load from the main battery due to a failure of the main battery or the like, it is possible to supply the power source power from the sub-battery instead of the main battery.

For example, a battery system control device of Patent Literature JP-A-2016-187235 includes a main battery and a sub-battery. Two switches are connected in series between a power source line on a main battery side and a power source line on a sub-battery side. Therefore, by controlling the two switches, the power source power can be supplied from the main battery to each load, and the power source power can also be supplied from the sub-battery.

SUMMARY

In a general in-vehicle system including a main battery and a sub-battery, normally, the power source power is supplied from the main battery side to each load, and the power source line on the sub-battery side is disconnected from the load by the switch. Then, when it is detected that the power from the main battery is interrupted due to some reason, the switch is controlled such that the power source line on the sub-battery side is connected to the load. Therefore, even when the power from the main battery is interrupted, since the source power can be supplied from the sub-battery to the load, function stop of load caused by the interruption of the power source power supply is prevented.

However, when a supply source of the power source power to be supplied to the important load is switched from the main battery side to the sub-battery side, a temporal operation delay occurs. That is, a delay from when the power from the main battery is actually interrupted to when a control unit detects the state, and a delay from when the control unit controls the switch to when the switch is actually switched and the source power on the sub-battery side starts to be supplied to the load are considered.

Therefore, the power source power is not supplied to the load for a period from when the power supply from the main battery is interrupted to when the power source power on the sub-battery side starts to be supplied to the load, for example, about several seconds. That is, the load may not function continuously. As a result, a driving assistance function, an automatic driving function, and the like in the automobile may not work continuously.

For example, if an important load itself has a large capacity capacitor or a large capacity battery incorporated therein, it is possible to avoid function stop during a period from when the power from the main battery is interrupted to when the source power on the sub-battery side starts to be supplied to the load. However, since a large capacity capacitor or battery is large and heavy, it is not desirable to incorporate the capacitor or battery in the load. Further, there is also a concern that the cost of the entire in-vehicle system increases.

The present invention has been made in view of the above circumstances, and an object thereof is to provide a power supply system capable of preventing supply of power source power to an important load from being temporarily stopped when a supply source of the power source power to the important load is switched from a main battery side to a sub-battery side due to interruption of power from a main battery or the like.

Solution to Problem

In order to achieve the above object, the power supply system according to the present invention is characterized by the following (1) to (5).

(1) A power supply system having a main power source, a sub-power source, one or more loads, and a switch configured to control ON/OFF of power supply from the main power source and the sub-power source to the load, includes:

a first switch which is connected between the main power source and the load and whose ON/OFF is capable of being controlled;

a second switch which is connected between the sub-power source and the load and whose ON/OFF is capable of being controlled; and a backflow prevention circuit configured to prevent current backflow between the main power source and the sub-power source, and the backflow prevention circuit allows current passage in a direction from the sub-power source to the load in a state where at least the second switch is in an off state.

(2) In the power supply system descried in the above (1), the backflow prevention circuit includes a first diode configured to allow current passage in a direction from the main power source to a power source line of the load and to prevent current passage in a reverse direction; and a second diode configured to allow current passage in a direction from the sub-power source to the power source line of the load, and to prevent current passage in a reverse direction, the first switch and the first diode are connected in parallel, and the second switch and the second diode are connected in parallel.

(3) In the power supply system described in the above (2), at least one of the first diode and the second diode is a body diode parasitized in a semiconductor switch device constituting the first switch and/or the second switch.

(4) The power supply system described in the above (1) further includes a power source control unit configured to control ON/OFF of the first switch and ON/OFF of the second switch, and the power source control unit controls ON/OFF of the first switch and ON/OFF of the second switch according to a result of detecting at least one of: a temperature change in a vicinity of the second switch; a current flowing on a main power source side; and a direction of a current in a power source line connected to the load.

(5) In the power supply system described in the above (1), the load includes one or more sensor devices that contribute to automation of driving of a vehicle.

According to the power supply system having a configuration of the above (1), it is possible to avoid temporarily stopping supply of the power source power to the load when a supply source of the power source power to the load is switched from the main power source side to the sub-power source side due to interruption of power from the main power source, That is, since the backflow prevention circuit allows current passage in a direction from the sub-power source to the load at a timing during a period from when the power from the main power source is interrupted to when the second switch is switched on, the power source power of the sub-power source can be supplied to the load without using a current path of the second switch. In other words, when the power from the main power source is interrupted, the power source power is immediately supplied from the sub-power source side to the load, so that the power supply to the load is not interrupted and function stop in the load does not occur even if it takes time to switch the supply source of the power source power.

According to the power supply system having a configuration of the above (2), the first diode allows current passage in the direction from the main power source to the power source line of the load, and prevents current passage in the reverse direction. The second diode allows current passage in the direction from the sub-power source to the power source line of the load, and prevents current passage in the reverse direction. Further, since the first switch and the first diode are connected in parallel, a current can flow in a forward direction of the first diode and power can be supplied to the load even when the first switch is in an off state. Further, since the second switch and the second diode are connected in parallel, a current can flow in a forward direction of the second diode and power can be supplied to the load even when the second switch is in an off state.

According to the power supply system having a configuration of the above (3), a necessary circuit can be configured with a small number of components. For example, since a semiconductor switch device such as a MOS field effect transistor (FET) has a body diode parasitized in a structure thereof, when the body diode is used as the first diode or the second diode, there is no need to add the first diode or the second diode as a new component, so that the number of components can be reduced.

According to the power supply system having a configuration of the above (4), since the power source control unit can grasp the interruption of power from the power source, appropriate control can be performed. For example, when a body diode is used as the second diode, there is a possibility that the body diode generates heat and the temperature rises during energization, and an upper limit of a current value must be severe than usual. However, since the power source control unit performs appropriate control, occurrence of a problem in the body diode can be avoided.

According to the power supply system having a configuration of the above (5), it is possible to prevent occurrence of instantaneous interruption or the like of the power source power supplied to the sensor device. As a result, it can be expected to improve reliability in automation of driving of a vehicle.

According to the power supply system of the present invention, supply of the power source power to the important load can be prevented from being temporarily stopped when the supply source of the power source power to the important load is switched from the main battery side to the sub-battery side due to interruption of power from the main battery or the like. That is, since the backflow prevention circuit allows current passage in a direction from the sub-power source to the load at a timing during a period from when the power from the main power source is interrupted to when the second switch is switched on, the power source power of the sub-power source can be supplied to the load without using a current path of the second switch. In other words, when interruption of power from the main power source occurs, the power source power is immediately supplied from the sub-power source side to the load, so that the power supply to the load is not interrupted and function stop in the load does not occur even if it takes time to switch the supply source of the power source power.

The present invention has been briefly described above. Further, details of the present invention will be clarified by reading a mode (hereinafter, referred to as "embodiment") for carrying out the invention to be described below with reference to attached drawings.

BRIEF DESCRIPTION OF THE DRAWINGS

FIG. 2 is a table schematically showing a list of a plurality of states in the power supply system shown in FIG. 1.

DETAILED DESCRIPTION OF EMBODIMENTS

A specific embodiment according to the present invention will be described below with reference to the drawings.

Figure 1:
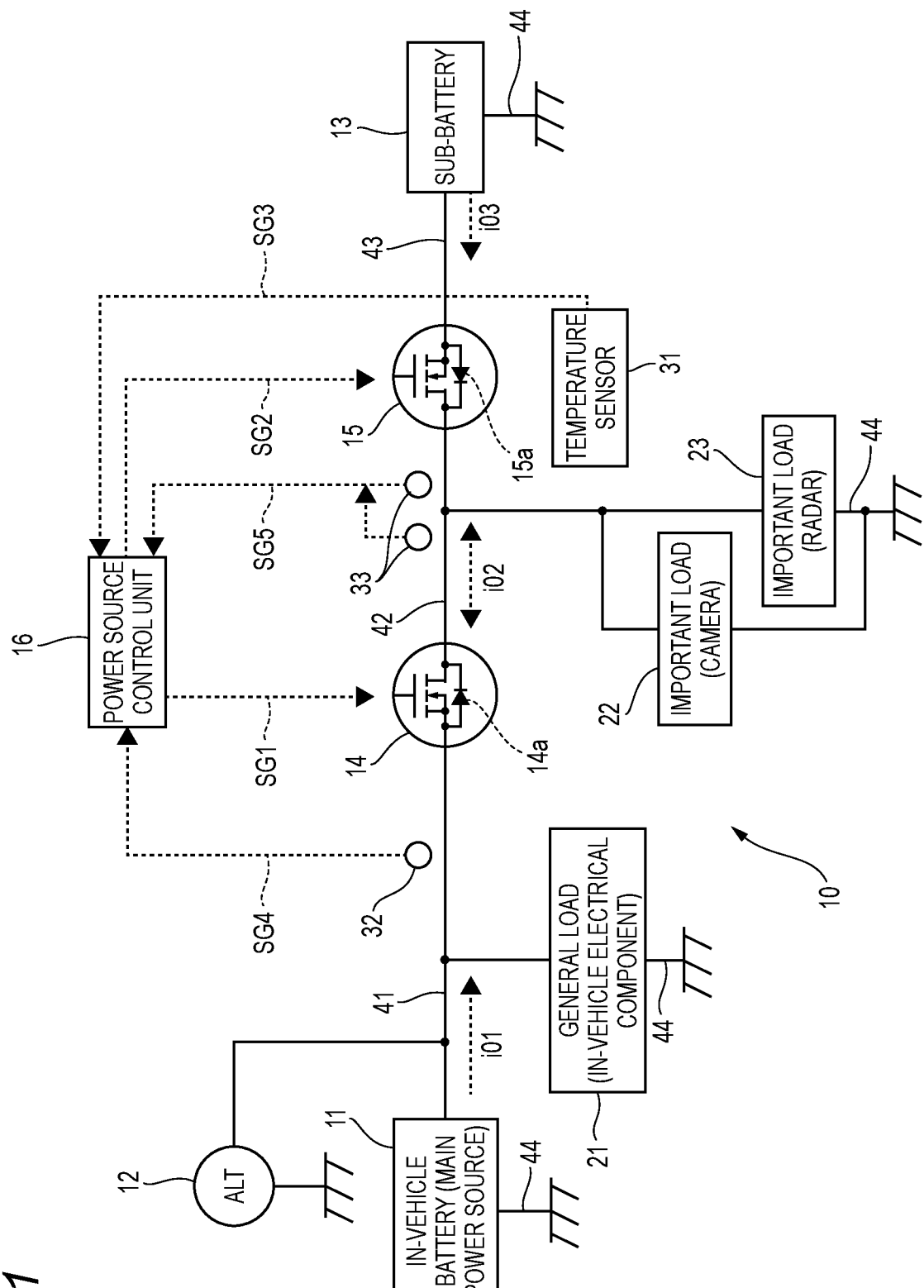
FIG. 1 is an electric circuit diagram showing a configuration example of a power supply system according to an embodiment of the present invention.

FIG. 1 is an electric circuit diagram showing a configuration example of a power supply system 10 according to an embodiment of the present invention.

The power supply system 10 according to the present embodiment is configured on an assumption that a function of supplying power source power to loads such as various electrical components is realized on a vehicle such as an automobile. In particular, the power supply system 10 of the present embodiment has a special function so as not to interrupt the supply of the power source power including instantaneous interruption to an important load.

The power supply system 10 includes an in-vehicle battery 11 as a main power source. Further, a sub-battery 13 is also provided in a case where power from the main power source is interrupted. An alternator (ALT) 12 generates power during operation of the host vehicle and outputs DC power source power. The power source power supplied by the alternator 12 can be used to charge the in-vehicle battery 11 and the sub-battery 13.

As an example, a rated power source voltage output from the in-vehicle battery 11 and a rated power source voltage output from the sub-battery 13 are set to about 12V. The output voltage of the in-vehicle battery 11 (for example, 14V) is higher than the output voltage of the sub-battery 13 due to the effect of charging operation or the like.

In the example shown in FIG. 1, a general load 21, and important loads 22, 23 exist as loads installed in the host vehicle. The general load 21 corresponds to, for example, a general electrical component such as a vehicle interior lighting lamp, a mirror driving motor, a window opening/closing motor, a door locking motor, a wiper driving motor, and a heater.

The important load 22 is an electrical component used for driving operation assistance and automation of driving, and corresponding to, for example, an in-vehicle camera that captures an image of such as a forward direction of the host vehicle or an electronic control unit (ECU) that digitally processes the image to grasp a positional relationship between the host vehicle and a load and to detect an obstacle or the like.

The important load 23 is an electrical component used for the driving operation assistance and the automation of driving, and corresponding to, for example, a radar for monitoring a surrounding situation such as forward, lateral, or rearward directions of the host vehicle to detect an obstacle or the like.

If functions of the important loads 22, 23 are stopped even for a short period of time, grasping of the driving situation may be adversely affected and the reliability of the automatic driving and the like may be reduced. Therefore, it is necessary to prevent instantaneous interruption of power supply to the important loads 22, 23 during switching of a supply source of the power source power.

In the example shown in FIG. 1, the general load 21 is connected to a power source line 41, and the important loads 22, 23 are connected to a power source line 42. Further, the in-vehicle battery 11 and the alternator 12 are connected to the power source line 41, and the sub-battery 13 is connected to a power source line 43.

The power source line 41 on a main power source side and the power source line 42 on a load side are connected via a semiconductor switch device 14. The power source line 43 on a sub-power source side and the power source line 42 are connected via a semiconductor switch device 15.

As shown in FIG. 1, the semiconductor switch devices 14, 15 of the present embodiment are both MOS power FETs whose conduction ON/OFF can be controlled. Therefore, the semiconductor switch device 14 includes a body diode 14a parasitized therein, and the semiconductor switch device 15 also includes a body diode 15a.

The body diode 14a of the semiconductor switch device 14 is connected with a polarity that conduction in a direction from the power source line 41 on the main power source side to the power source line 42 on the important load side is allowed, and a current in a reverse direction is blocked. Further, the body diode 15a of the semiconductor switch device 15 is connected with a polarity that conduction in a direction from the power source line 43 on the sub-power source side to the power source line 42 on the important load side is allowed, and a current in a reverse direction is blocked. In the power supply system 10 of the present embodiment, unlike a general circuit configuration, the body diodes 14a, 15a are actively used to realize a special function.

As shown in FIG. 1, a temperature sensor 31 is provided in a vicinity of the semiconductor switch device 15, The temperature sensor 31 is provided to detect a temperature change caused by heat generation of the body diode 15a.

A current sensor 32 is connected to the power source line 41 on the main power source side. The current sensor 32 is used to detect magnitude of a power source current i01 flowing from the in-vehicle battery 11 toward the load side. The current sensor 32 can be configured with, for example, a resistor having a very small resistance value and a detector that detects a minute potential difference between both ends of the resistor with high sensitivity.

Further, a current sensor 33 is connected to the power source line 42 of the important loads 22, 23. The current sensor 33 is used to detect a current flowing direction of a power source current i02 flowing through the power source line 42. That is, a state where the power source current i02 flows from the in-vehicle battery 11 toward the important loads 22, 23 and a state where the power source current i02 flows from the sub-battery 13 toward the important loads 22, 23 are distinguished by the output of the current sensor 33.

The power supply system 10 includes a power source control unit 16 for controlling the entire power supply system 10. The power source control unit 16 is configured as an electronic control unit including a control element such as a microcomputer.

The power source control unit 16 shown in FIG. 1 can control ON/OFF of the semiconductor switch device 14 using a control signal SG1. Further, the power source control unit 16 can control ON/OFF of the semiconductor switch device 15 using a control signal SG2. By monitoring signals SG3, SG4 and SG5, the power source control unit 16 can grasp detection states of the temperature sensor 31, and the current sensors 32, 33, respectively.

Figure 3A:
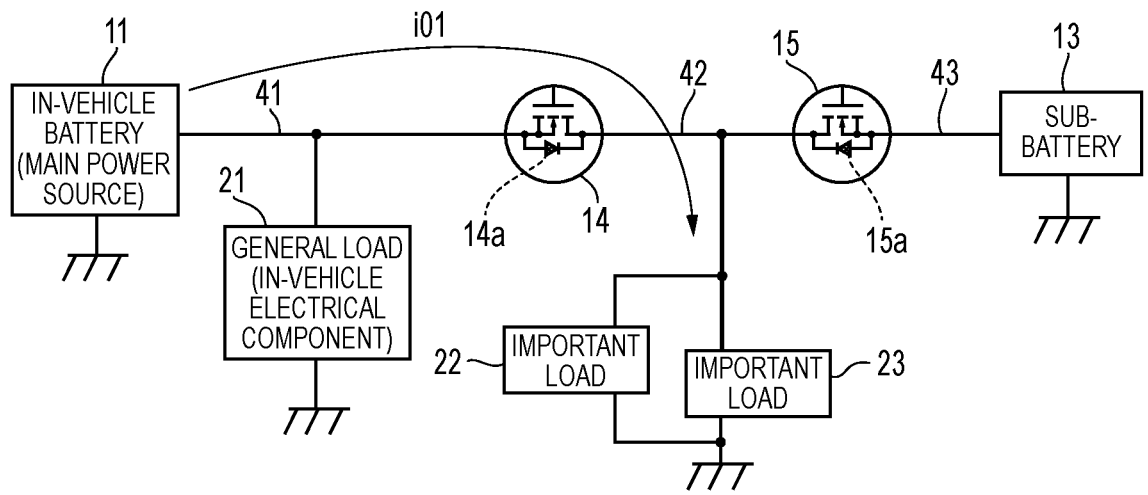
FIGS. 3A, 3B and 3C are electric circuit diagrams showing power source current paths in different states of the power supply system shown in FIG. 1.
Figure 3B:
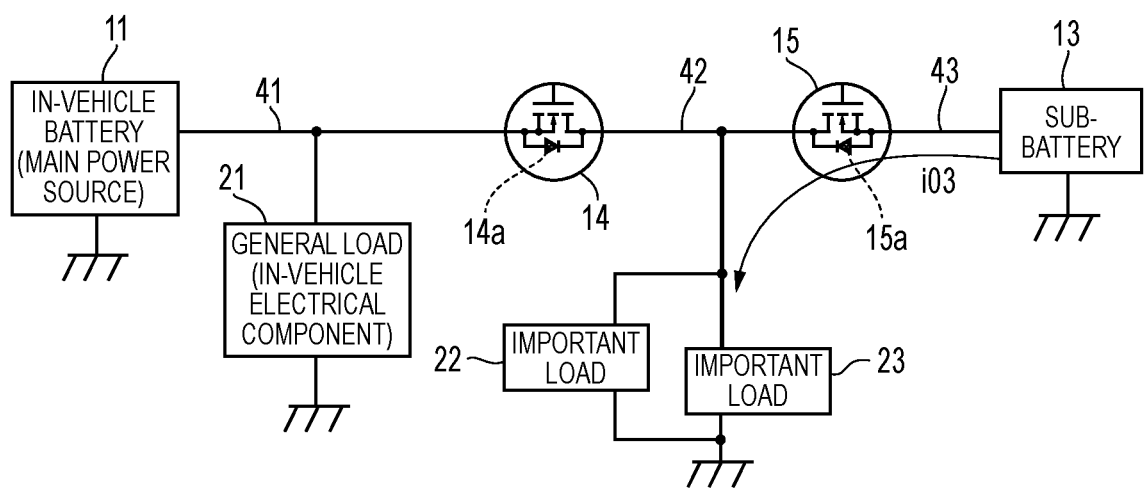
Figure 3C:
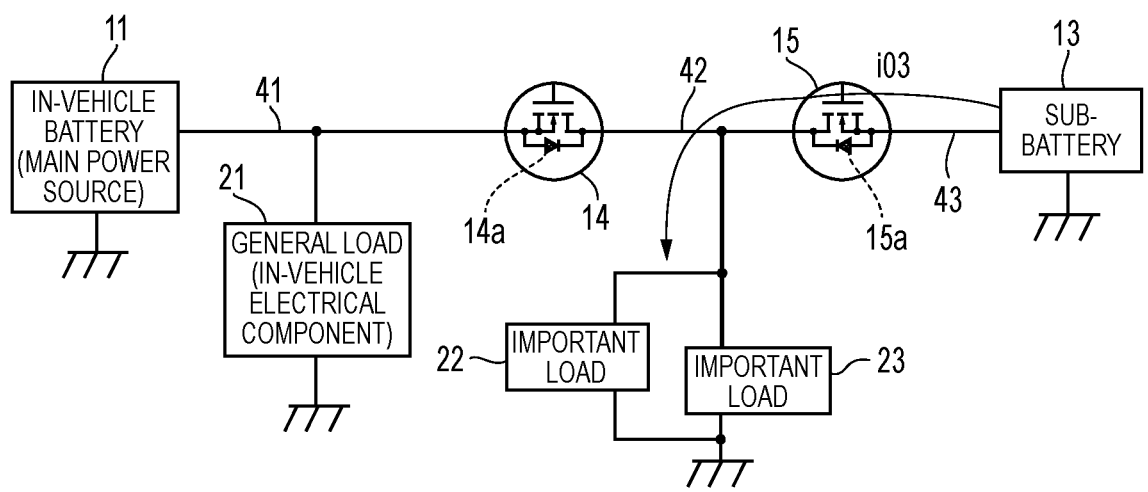

FIG. 2 is a table schematically showing a list of a plurality of states in the power supply system 10 shown in FIG. 1, Further, FIGS. 3A, 3B and 3C are electric circuit diagrams showing power source current paths in different states of the power supply system 10 shown in FIG. 1.

[State A]

In a normal operating state of the vehicle, the semiconductor switch device 14 is turned on and the semiconductor switch device 15 is turned off as in a "state A" shown in FIG. 2. Therefore, as shown in FIG. 3A, the power source current i01 passes through a main body of the semiconductor switch device 14, and the power source power of the in-vehicle battery 11 is supplied to the important loads 22, 23.

Further, since the voltage of the in-vehicle battery 1 is usually higher than that of the sub-battery 3, a bias voltage in a reverse direction is applied to the body diode 15a, and the body diode 15a prevents current backflow. Since the semiconductor switch device 15 is turned off, a current (i03) does not flow from the sub-battery 3 toward the power source line 42. As a result, only the main power source supplies power to the important loads 22, 23.

[State B]

When the power from the main power source is interrupted due to some reason, a predetermined power source voltage does not appear in the power source line 41. However, it is difficult to instantaneously grasp occurrence of interruption of power from the main power source, and a "state B" shown in FIG. 2 is obtained immediately after the power from the main power source is interrupted. In the "state B", the semiconductor switch device 14 is also turned on and the semiconductor switch device 15 is kept off similarly to the "state A".

However, when a voltage of the power source line 42 decreases and is lower than the voltage of the sub-battery 13, a bias voltage in a forward direction is applied to the body diode 15a, and the body diode 15a is brought into a conductive state. Therefore, as shown in FIG. 3B, the power source current i03 flows through a path passing through the body diode 15a, and the power source power of the sub-battery 13 is supplied to the important loads 22, 23.

That is, when the interruption of the power from the main power source occurs, the state transitions from the "state A" to the "state B", so that the power source power of the sub-battery 13 can be supplied to the important loads 22, 23 without switching the states of the semiconductor switch devices 14, 15. Therefore, even when the power from the main power source is interrupted, the important loads 22, 23 can operate continuously.

Accordingly, when the body diode 15a is used for a purpose of causing the power source current i03 to flow actively, it is necessary to design the body diode 15a in consideration of a temperature rise caused by heat generation and a limit of the current value in advance.

Since the semiconductor switch device 14 is turned on in the "state B", the power source power of the sub-battery 3 is also supplied to the general load 21 via the power source line 43, the body diode 15a, the power source line 42, and the semiconductor switch device 14.

[State C]

When the power source control unit 16 shown in FIG. 1 detects interruption of power from the main power source, the state transitions from the "state B" to a "state C" in FIG. 2 under the control of the power source control unit 16. In the "state C", as shown in FIG. 2, the semiconductor switch device 14 is turned off and the semiconductor switch device 15 is turned on.

Therefore, as shown in FIG. 3C, the power source current i03 flows to pass through a main body of the semiconductor switch device 15, and the power source power of the sub-battery 13 is supplied to the important loads 22, 23. In this case, since a resistance value of the main body of the semiconductor switch device 15 in the ON state is smaller than that of the body diode 15a, the current flowing through the body diode 15a greatly decreases.

Further, since the semiconductor switch device 14 is turned off and a bias voltage in a reverse direction is applied to the body diode 14a, a current in a direction from the power source line 42 to the power source line 41 is prevented, and the power source power supply to the general load 21 is stopped.

As described above, when the power from the main power source is interrupted, since the state of the power supply system 10 transitions from the "state A" to the "state C" via the "state B", the power source power supply to the important loads 22, 23 is not interrupted even when a delay occurs in detection of the interruption of power from the main power source and it takes time to switch the ON/OFF states of the semiconductor switch devices 14, 15.

[Operation of Power Supply System]

Figure 4:
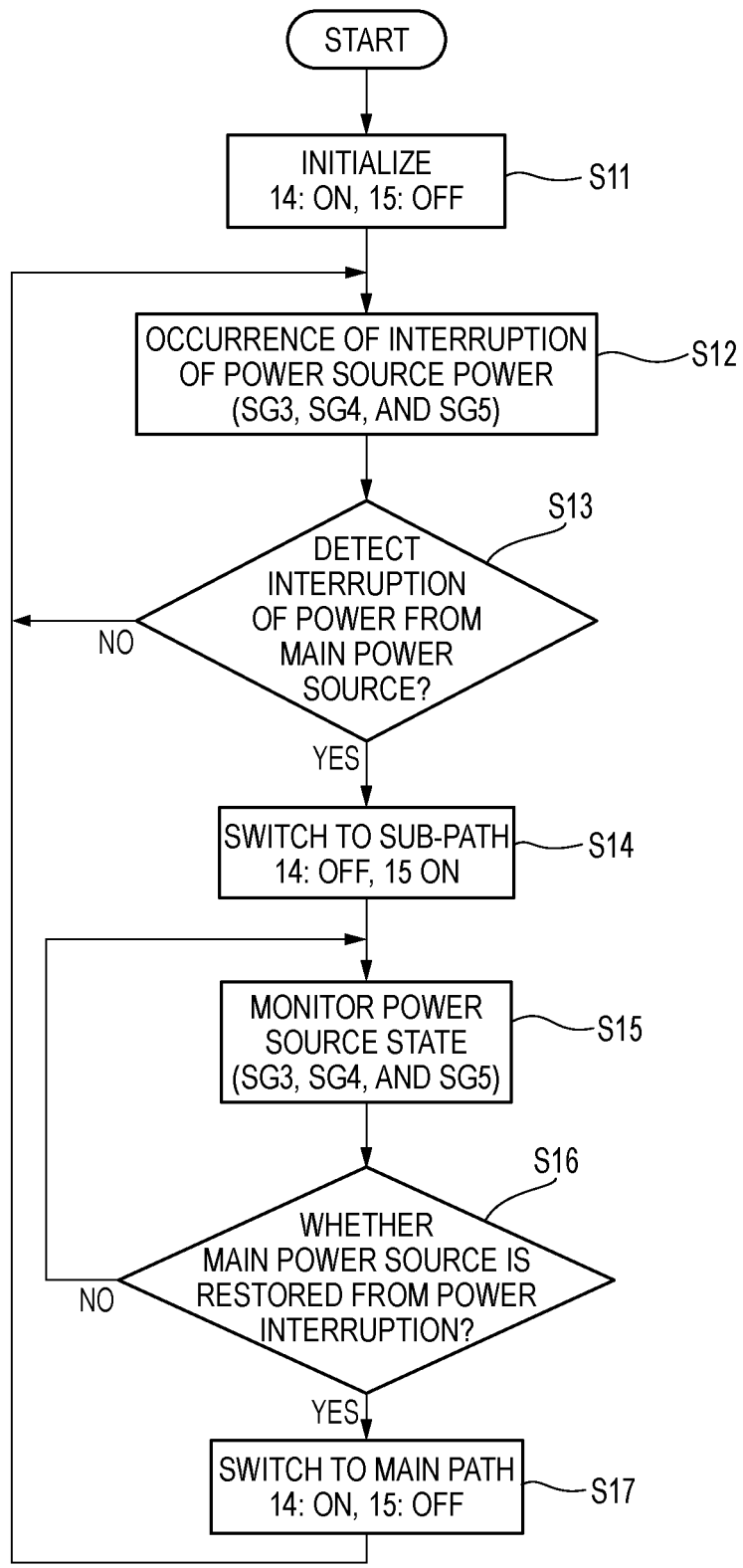
FIG. 4 is a flowchart showing an operation example of the power supply system shown in FIG. 1.

FIG. 4 is a flowchart showing an operation example of the power supply system 10 shown in FIG. 1. Control shown in FIG. 4 is performed by the power source control unit 16.

In an initial state where the power supply from the main power source is not interrupted, the power source control unit 16 outputs the control signals SG1, SG2 in a first step S11, the semiconductor switch device 14 on the main power source side is turned on, and the semiconductor switch device 15 on the sub-battery 13 side is turned off. As a result, the "state A" shown in FIG. 2 is obtained. That is, as shown in FIG. 3A, the power source current i01 flows and the power source power from the in-vehicle battery 11 is supplied to the important loads 22, 23.

In step S12, the power source control unit 16 monitors states of the signals SG3, SG4, and SG5. The monitoring makes it possible to identify occurrence of interruption of power from the main power source. That is, when the power from the main power source is interrupted, the state transitions from the "state A" to the "state B" in FIG. 2, and the power source current i03 flows through the body diode 15a as shown in FIG. 3B. Therefore, the body diode 15a generates heat and a temperature increases, so that the change can be detected by the temperature sensor 31.

Further, since the state is changed from the state of FIG. 3A to the state of FIG. 3B when the power from the main power source is interrupted, the power source current i01 flowing through the power source line 41 greatly decreases. Therefore, by detecting magnitude of the power source current i01 using the current sensor 32, occurrence of the interruption of power from the main power source can be identified.

Further, since the state is changed from the state of FIG. 3A to the state of FIG. 3B when the interruption of power from the main power source occurs, a direction of the current flowing through the power source line 42 changes accordingly. Therefore, by detecting the direction of the current in the power source line 42 using the current sensor 33, the occurrence of interruption of power from the main power source can be identified.

Based on the states of the signals SG3, SG4, and SG5 monitored in step S12, the power source control unit 16 identifies the occurrence of interruption of power from the main power source based on a combination of one or more conditions such as a temperature rise of the body diode 15a, a decrease in the power source current i01 flowing through the power source line 41, and a change in the direction of the current flowing through the power source line 42. Further, when the interruption of power from the main power source is detected, the process proceeds from step S13 to step S14.

In step S14, the power source control unit 16 switches the states of the control signals SG1 and SG2, the semiconductor switch device 14 on the main power source side is turned off, and the semiconductor switch device 15 on the sub-battery 13 side is turned on. As a result, the "state C" shown in FIG. 2 is obtained. That is, as shown in FIG. 3C, the power source current i03 flows through the path passing through the main body of the semiconductor switch device 15, and the power source power from the sub-battery 3 is supplied to the important loads 22, 23.

As a matter of course, since the circuit of the power supply system 10 transits to the "state B" before transiting to the "state C" by the power source control unit 16 executing step S14, the power source current i03 flows through the body diode 15a as shown in FIG. 3B before step S14 is executed. Therefore, even when a delay occurs in the execution timing of step S14, the power source power supply to the important loads 22, 23 is not interrupted.

After the transition to the "state C", the power source control unit 16 monitors the states of the signals SG3, SG4, and SG5 in step S15. Thus, it is determined whether or not the supply of power from the main power source is restored from the interrupted state.

When the main power source is restored to the normal state, the power source control unit 16 proceeds to step S17 from step S16 and the state transitions to the "state A". That is, the states of the control signals SG1 and SG2 are switched, the semiconductor switch device 14 is turned on, and the semiconductor switch device 15 is turned off. Therefore, the state shown in FIG. 3A is obtained, and the power source power from the in-vehicle battery 11 is supplied again to the important loads 22, 23 via the power source line 41, the semiconductor switch device 14, and the power source line 42.

Even before the power source control unit 16 switches the state from the state of FIG. 3C to the state of FIG. 3A under the control of step S17, since the power source current i01 flows when the main power source is restored, the power source power supply to the important loads 22, 23 is not interrupted during the switching.

That is, when the main power source is restored, since the voltage of the power source line 41 is higher than that of the power source line 42, the body diode 14a is biased by a voltage in the forward direction, and the power source current i01 flows through the body diode 14a even when the semiconductor switch device 14 is turned off.

As described above, in the power supply system 10 according to the present embodiment, when the power from the main power source is interrupted due to a failure of the in-vehicle battery 11 and the like, the power source power supply to the important loads 22, 23 can be prevented from being interrupted temporarily. That is, since the power source current i03 flows through the path of the body diode 15a, as shown in FIG. 3B, even at the timing before the power source control unit 16 switches on the semiconductor switch device 15, the power source power of the sub-battery 3 can be immediately supplied to the important loads 22, 23.

Therefore, it is possible to improve the reliability of the power source power supply to the important loads 22, 23 used for the driving assistance and the automatic driving, such as an in-vehicle camera and a radar, and to improve safety in the vehicle driving.

In addition, when the power from the main power source is interrupted, the power source control unit 16 switches on the semiconductor switch device 15, and thus continuation of heat generation of the body diode 15a can be avoided. Further, by switching off the semiconductor switch device 14, the power source power of the sub-battery 13 can be prevented from flowing toward the power source line 41 side and the time before the power source power of the sub-battery 13 is consumed can be extended.

Further, the power source control unit 16 detects the temperature change in a vicinity of the body diode 15a, the magnitude of the power source current i01 flowing through the power source line 41, and the direction of the power source current i02 flowing through the power source line 42, the occurrence of interruption of power from the main power source can be identified correctly.

Each of the semiconductor switch devices 14, 15 shown in FIG. 1, for example, may be replaced by a component other than the semiconductor switch device, such as a mechanical relay. However, in that case, it is necessary to connect a new component having a function equivalent to each of the body diodes 14a and 15a, that is, a diode in parallel with each contact point. However, adopting the semiconductor switch devices 14, 15 as shown in FIG. 1 is advantageous in reducing the number of components, and reducing the size and weight.

The occurrence of interruption of power from the main power source can be identified by just monitoring any one of the signals SG3 to SG5 monitored in step S12 of FIG. 4 by the power source control unit 16. The occurrence of interruption of power from the main power source may be identified based on an appropriate combination of a plurality of states of the signals SG3 to SG5.

Here, features of the power supply system according to the embodiment of the present invention described above will be briefly summarized in the following [1] to [5].

[1] A power supply system (10) having a main power source (in-vehicle battery 11), a sub-power source (sub-battery 13), one or more loads (important loads 22, 23), and a switch configured to control ON/OFF of power supply from the main power source and the sub-power source to the load, including:

a first switch (semiconductor switch device 14) which is connected between the main power source and the load and whose ON/OFF is capable of being controlled;

a second switch (semiconductor switch device 15) which is connected between the sub-power source and the load and whose ON/OFF is capable of being controlled; and a backflow prevention circuit (body diodes 14a, 15a) configured to prevent current backflow between the main power source and the sub-power source, and the backflow prevention circuit (body diode 15a) allows current passage in a direction from the sub-power source to the load in a state where at least the second switch is in an off state.

[2] The power supply system according to the above [1], wherein the backflow prevention circuit includes a first diode (body diode 14a) configured to allow current passage in a direction from the main power source to a power source line of the load and to prevent current passage in a reverse direction; and a second diode (body diode 15a) configured to allow current passage in a direction from the sub-power source to the power source line of the load, and to prevent current passage in a reverse direction, the first switch and the first diode are connected in parallel, and the second switch and the second diode are connected in parallel.

[3] The power supply system according to the above [2], wherein at least one of the first diode and the second diode is a body diode (14a, 15a) parasitized in a semiconductor switch device (14, 15) constituting the first switch and/or the second switch.

[4] The power supply system according to any one of the above [1] to [3], further including a power source control unit (16) configured to control ON/OFF of the first switch and ON/OFF of the second switch, and the power source control unit controls ON/OFF of the first switch and ON/OFF of the second switch (S12 to S14) according to a result of detecting at least one of: a temperature change in a vicinity of the second switch; a current flowing on a main power source side; and a direction of a current in a power source line connected to the load.

[5] The power supply system according to any one of the above [1] to [4], wherein the load includes one or more sensor devices (important loads 22, 23) that contribute to automation of driving of a vehicle.

What is claimed is:

1. A power supply system comprising:
a main power source;
a sub-power source;
one or more loads;

a switch assembly configured to control ON/OFF of power supply from the main power source and the sub-power source to the load, the switch assembly including:
- a first switch which is connected between the main power source and the load and whose ON/OFF is capable of being controlled;
- a second switch which is connected between the sub-power source and the load and whose ON/OFF is capable of being controlled; and
- a backflow prevention circuit configured to prevent current backflow between the main power source and the sub-power source, the backflow prevention circuit allows current passage in a direction from the sub-power source to the load in a state where at least the second switch is in an off state; and a power source control unit configured to control ON/OFF of the first switch and ON/OFF of the second switch, the power source control unit being configured to,
- determine an interruption of power supplied by the main power source according to a result of detecting each of: a temperature change in a vicinity of the second switch; a current flowing on a main power source side; and a direction of a current in a power source line connected to the load when the first switch is an on state and the second switch is in the off state,
- change the first switch from the on state to the off state and the second switch from the off state to the on state when the power source controller determines the interruption of power.

2. The power supply system according to claim 1, wherein the backflow prevention circuit includes a first diode configured to allow current passage in a direction from the main power source to at power source line of the load and to prevent current passage in a reverse direction; and a second diode configured to allow current passage in a direction from the sub-power source to the power source line of the load, and to prevent current passage in a reverse direction,
the first switch and the first diode are connected in parallel, and
the second switch and the second diode are connected in parallel.

3. The power supply system according to claim 2, wherein at least one of the first diode and the second diode is a body diode parasitized in a semiconductor switch device constituting the first switch and/or the second switch.

4. The power supply system according to claim 1, wherein the load includes one or more sensor devices that contribute to automation of driving of a vehicle.

5. The power supply system according to claim 1, wherein the power source controller is configured to,
determine a restoration of power supplied by the main power source according to a result of detecting a current flowing on a main power source side, when the first switch is in the off state and the second switch is in the on state, and
change the first switch from the off state to the on state and the second switch from the on state to the off state when the power source controller determines the restoration of power.

* * * * *